(12) United States Patent
Haralson (10) Patent No.: US 9,214,186 B1
(45) Date of Patent: Dec. 15, 2015

(54) DATA STORAGE DEVICE MEASURING RADIAL OFFSET BETWEEN READ ELEMENT AND WRITE ELEMENT

(71) Applicant: Western Digital Technologies, Inc., Irvine, CA (US)

(72) Inventor: Phillip Scott Haralson, Huntington Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/666,118

(22) Filed: Mar. 23, 2015

(51) Int. Cl.
*G11B 21/02* (2006.01)
*G11B 5/596* (2006.01)
*G11B 20/10* (2006.01)

(52) U.S. Cl.
CPC ................................ *G11B 20/10472* (2013.01)

(58) Field of Classification Search
None
See application file for complete search history.

(56) References Cited

U.S. PATENT DOCUMENTS

| | | | |
|---|---|---|---|
| 5,500,776 A | 3/1996 | Smith | |
| 5,691,857 A | 11/1997 | Fitzpatrick et al. | |
| 5,949,602 A | 9/1999 | Ishioka et al. | |
| 6,008,962 A | 12/1999 | Le et al. | |
| 6,018,789 A | 1/2000 | Sokolov et al. | |
| 6,025,969 A | 2/2000 | Ishioka et al. | |
| 6,061,201 A | 5/2000 | Woods | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |

(Continued)

OTHER PUBLICATIONS

Poornima Nookala, et al., U.S. Appl. No. 14/666,080, filed Mar. 23, 2015, 25 pages.

*Primary Examiner* — K. Wong (57) ABSTRACT

A data storage device is disclosed comprising a disk comprising a plurality of tracks and a head actuated over the disk, wherein the head comprises a read element radially offset from a write element. A first pattern is written to a single track, and the first pattern is read from the single track to generate a first read signal from which a first quality metric is generated. A second pattern is written to the single track, wherein the second pattern is different from the first pattern. The second pattern is read from the single track to generate a second read signal from which a second quality metric is generated. The radial offset of the read element and write element is measured based on the first and second quality metrics.

29 Claims, 5 Drawing Sheets

(56) References Cited

U.S. PATENT DOCUMENTS

| | | |
|---|---|---|
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,293,135 B1 | 9/2001 | Marchon et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,421,197 B1 | 7/2002 | Abdelnour |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,476,992 B1 | 11/2002 | Shimatani |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,510,017 B1 | 1/2003 | Abdelnour |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,631,046 B2 | 10/2003 | Szita et al. |
| 6,639,748 B1 | 10/2003 | Christiansen et al. |
| 6,647,481 B1 | 11/2003 | Luu et al. |
| 6,650,491 B2 | 11/2003 | Suzuki et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,700,724 B2 | 3/2004 | Riddering et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,042 B2 | 6/2004 | Bi et al. |
| 6,751,402 B1 | 6/2004 | Elliott et al. |
| 6,754,030 B2 | 6/2004 | Seng et al. |
| 6,757,481 B1 | 6/2004 | Nazarian et al. |
| 6,765,744 B2 | 7/2004 | Gomez et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,785,081 B2 | 8/2004 | Chapin et al. |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,947,248 B2 | 9/2005 | Allen et al. |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |

(56) References Cited

U.S. PATENT DOCUMENTS

| | | |
|---|---|---|
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,161,759 B1 * | 1/2007 | Zhang et al. .................. 360/75 |
| 7,171,108 B1 | 1/2007 | Masters et al. |
| 7,171,110 B1 | 1/2007 | Wilshire |
| 7,180,692 B1 | 2/2007 | Che et al. |
| 7,193,809 B1 | 3/2007 | Allen |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,265,930 B2 | 9/2007 | Nakamura et al. |
| 7,271,977 B1 | 9/2007 | Melrose et al. |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,401 B2 | 11/2007 | Shen et al. |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 | 5/2008 | Dang et al. |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,423,830 B2 | 9/2008 | Ma et al. |
| 7,436,610 B1 | 10/2008 | Thelin |
| 7,437,502 B1 | 10/2008 | Coker |
| 7,440,214 B1 | 10/2008 | Ell et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,583,466 B2 | 9/2009 | Kermiche et al. |
| 7,596,797 B1 | 9/2009 | Kapner, III et al. |
| 7,599,139 B1 | 10/2009 | Bombet et al. |
| 7,616,398 B2 | 11/2009 | Gong et al. |
| 7,619,841 B1 | 11/2009 | Kupferman |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,796,356 B1 | 9/2010 | Fowler et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,843,660 B1 | 11/2010 | Yeo |
| 7,852,596 B2 | 12/2010 | Boyle et al. |
| 7,859,782 B1 | 12/2010 | Lee |
| 7,864,475 B2 | 1/2011 | Nakamura |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,000,053 B1 | 8/2011 | Anderson |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |

(56) References Cited

U.S. PATENT DOCUMENTS

| | | |
|---|---|---|
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 8,753,146 B1 | 6/2014 | Szeremeta et al. |
| 8,755,136 B1 | 6/2014 | Ng et al. |
| 8,756,361 B1 | 6/2014 | Carlson et al. |
| 8,760,782 B1 | 6/2014 | Garani et al. |
| 8,760,792 B1 | 6/2014 | Tam |
| 8,769,593 B1 | 7/2014 | Schwartz et al. |
| 8,773,793 B1 | 7/2014 | McFadyen |
| 8,773,802 B1 | 7/2014 | Anderson et al. |
| 8,773,807 B1 | 7/2014 | Chia et al. |
| 8,773,957 B1 | 7/2014 | Champion et al. |
| 8,780,470 B1 | 7/2014 | Wang et al. |
| 8,782,334 B1 | 7/2014 | Boyle et al. |
| 8,786,976 B1 | 7/2014 | Kang et al. |
| 8,787,125 B1 | 7/2014 | Lee |
| 8,792,196 B1 | 7/2014 | Lee |
| 8,792,200 B1 | 7/2014 | Tam et al. |
| 8,797,667 B1 | 8/2014 | Barlow et al. |
| 8,799,977 B1 | 8/2014 | Kapner, III et al. |
| 8,817,413 B1 | 8/2014 | Knigge et al. |
| 8,817,584 B1 | 8/2014 | Selvaraj |
| 8,825,976 B1 | 9/2014 | Jones |
| 8,825,977 B1 | 9/2014 | Syu et al. |
| 8,929,186 B1 | 1/2015 | Sharma et al. |
| 2007/0291401 A1 | 12/2007 | Sun et al. |
| 2009/0113702 A1 | 5/2009 | Hogg |
| 2009/0168623 A1 | 7/2009 | Furumiya |
| 2010/0306551 A1 | 12/2010 | Meyer et al. |
| 2011/0205861 A1 | 8/2011 | Erden et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

* cited by examiner

DATA STORAGE DEVICE MEASURING RADIAL OFFSET BETWEEN READ ELEMENT AND WRITE ELEMENT

CROSS REFERENCE TO RELATED APPLICATION(S)

This application is related to co-pending U.S. patent application Ser. No. 14/666,080 filed on Mar. 23, 2015, entitled "DATA STORAGE DEVICE CALIBRATING A LASER POWER FOR HEAT ASSISTED MAGNETIC RECORDING BASED ON SLOPE OF QUALITY METRIC," to Poornima Nookala, which is hereby incorporated by reference in its entirety.

BACKGROUND

Data storage devices such as disk drives may comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the actuator arm as it seeks from track to track.

Figure 1:
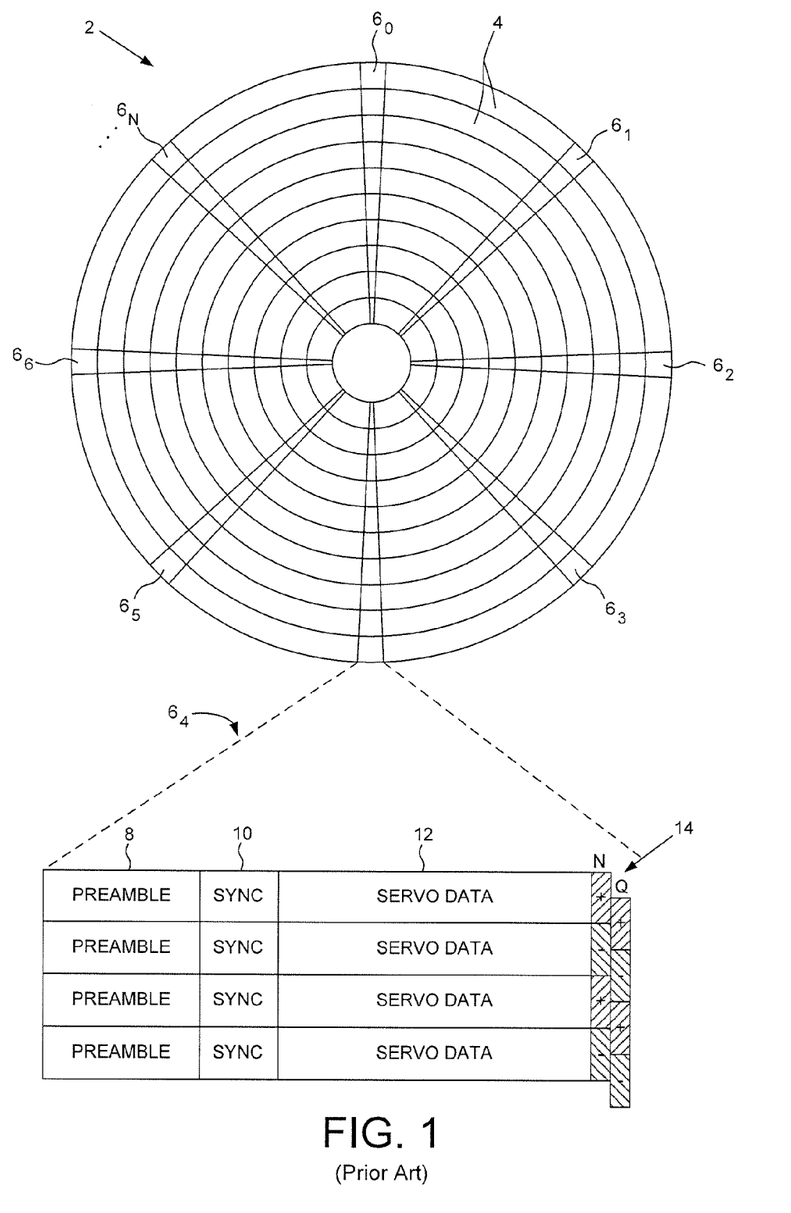
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
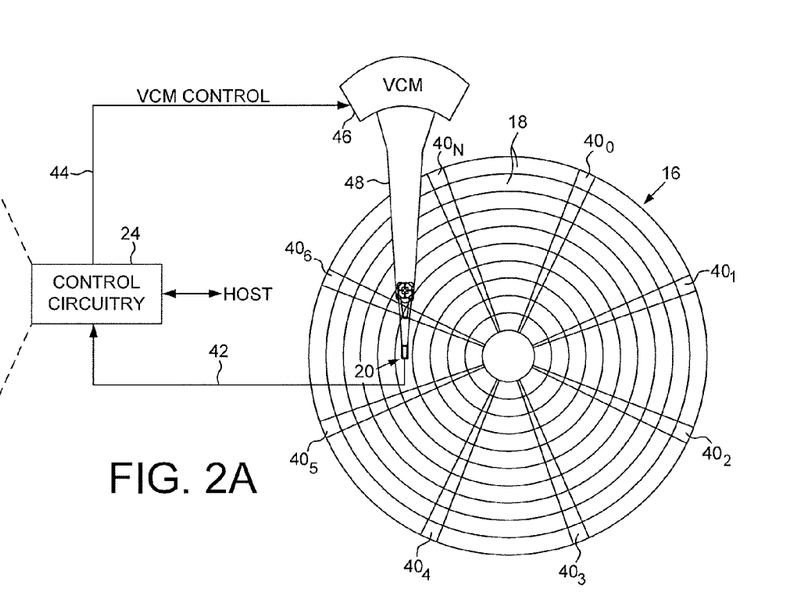
FIG. 2A shows a data storage device in the form of a disk drive according to an embodiment comprising a head actuated over a disk.

FIG. 2A shows a data storage device in the form of a disk drive according to an embodiment comprising a disk 16 comprising a plurality of tracks 18 and a head 20 actuated over the disk 16, wherein the head 20 (FIG. 2B) comprises a read element 22A radially offset from a write element 22B. The disk drive further comprises control circuitry 24 configured to execute the flow diagram of FIG. 2C wherein a first pattern is written to a single track (block 26), and the first pattern is read from the single track to generate a first read signal (block 28), wherein a first quality metric is generated based on the first read signal (block 30). A second pattern is written to the single track (block 32), wherein the second pattern is different from the first pattern. The second pattern is read from the single track to generate a second read signal (block 34), and a second quality metric is generated based on the second read signal (block 36). The radial offset of the read element and write element is measured based on the first and second quality metrics (block 38).

In the embodiment of FIG. 2A, the disk 16 comprises a plurality of servo sectors $40_0$-$40_N$ that define a plurality of servo tracks, wherein data tracks 18 are defined relative to the servo tracks at the same or different radial density. The control circuitry 24 processes a read signal 42 emanating from the head 20 to demodulate the servo sectors $40_0$-$40_N$ and generate a position error signal (PES) representing an error between the actual position of the head and a target position relative to a target track. A servo control system in the control circuitry 24 filters the PES using a suitable compensation filter to generate a control signal 44 applied to a voice coil motor (VCM) 46 which rotates an actuator arm 48 about a pivot in order to actuate the head 20 radially over the disk 16 in a direction that reduces the PES. The servo sectors $40_0$-$40_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

In one embodiment, writing a first and second pattern to a single track expedites the process of measuring the radial offset between the read element and write element as compared to first erasing the multiple adjacent tracks, and then writing a pattern to one of the tracks and scan reading the multiple adjacent tracks as has been done in the prior art. That is, in one embodiment the radial offset may be measured by writing two different patterns to a single track, and then generating a quality metric based on reading each pattern, where the difference between the quality metrics will be significantly greater when reading the single track as compared to when reading a non-erased track adjacent the single track. That is, after writing each test pattern to the single track, the control circuitry may perform a radial scan of multiple adjacent tracks near the expected location of the written track, where the difference between the quality metrics for the two test patterns may essentially spike (up or down) when reading the written track as compared to when reading an adjacent track.

The first pattern written to the target track may differ from the second pattern written to the target track in any suitable manner, for example, in one embodiment the first pattern may comprise an AC or DC erase signal, and the second pattern may comprise a suitable periodic pattern such as a 2T pattern. In another embodiment, the first pattern may comprise a first periodic pattern (e.g., a 2T pattern) and the second pattern may comprise a second periodic pattern (e.g., a 5T pattern). In one embodiment, the first and second patterns may comprise a known data pattern that is not necessarily periodic (e.g., a known random pattern).

Any suitable quality metric may be generated when reading the patterns from the disk. For example, in the embodiment where the first pattern comprises an AC or DC erase signal and the second pattern comprises a periodic pattern such as a 2T pattern, the quality metric may represent an amplitude of the read signal, such as a setting for a variable gain amplifier (VGA). The first quality metric (amplitude of the read signal) generated when reading the first pattern will be small since the track has been erased by writing the first pattern, and the second quality metric (amplitude of the read signal) generated when reading the second pattern will be large since the track is written with a periodic pattern. Accordingly, in one embodiment the radial offset between the read element and write element may be detected by scan reading multiple adjacent tracks near the expected location of the target track and evaluating the difference between the first quality metric and the second quality metric. In the embodiment wherein the first pattern comprises a first periodic pattern (e.g., a 2T pattern) and the second pattern comprises a second periodic pattern (e.g., a 5T pattern), the quality metric generated for each pattern may be generated by evaluating the read signal at the frequency of the pattern (e.g., by computing a discrete Fourier transform (DFT) of each read signal at the frequency of each pattern). Any suitable quality metric may be generated when reading the first and second patterns, such as a timing error, a signal sample error, a detected bit sequence, bit error rate, or any other suitable metric indicative of the recorded data. In one embodiment, the first and second patterns may comprise a known data pattern that may facilitate generating quality metrics such as a signal sample error or a bit error rate.

Figure 3:
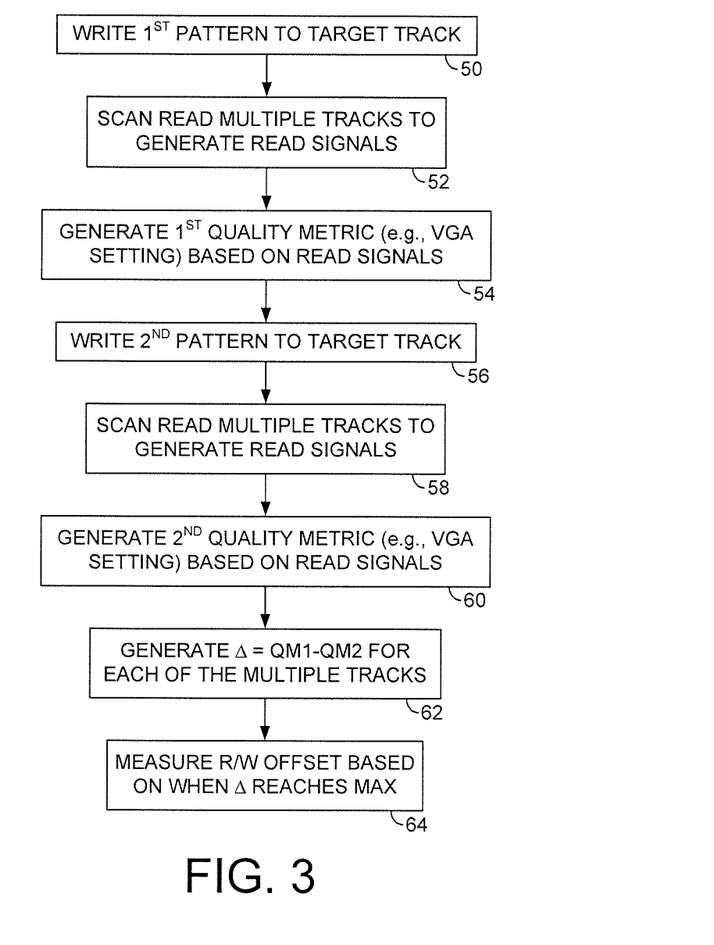
FIG. 3 is a flow diagram according to an embodiment wherein the first pattern is written during a first revolution of the disk, the first pattern is read during a second revolution of the disk to generate a first quality metric, the second pattern is written during a third revolution of the disk, the second pattern is read during a fourth revolution of the disk, and the radial offset is measured based on the first and second quality metrics.
Figure 4A:
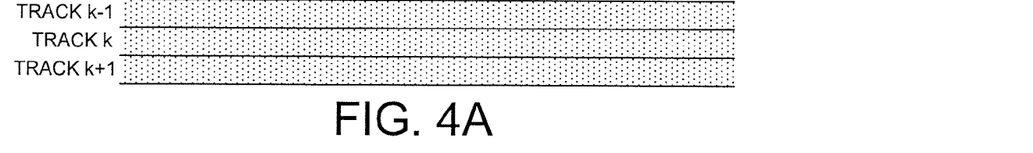
FIGS. 4A-4E illustrate an embodiment of the flow diagram of FIG. 3.

FIG. 3 is a flow diagram according to an embodiment which is understood with reference to the example shown in FIGS. 4A-4E. FIG. 4A shows a number of tracks, including a target track k and adjacent tracks k−1 and k−1. The tracks may be bulk erased as part of a manufacturing process for the disk, or the tracks may initially be in a random, unknown state. In one embodiment, the control circuitry 24 may write only to the target track k to measure the radial offset between the read element and write element, and in other embodiment, the control circuitry 24 may write to the target track k and adjacent tracks k−1 and k+1, such as to initially erase the tracks by writing an AC or DC erase signal.

When measuring the radial offset between the read element and write element, in one embodiment the control circuitry 24 positions the read element 22A at a target radial location by reading the servo sectors $40_0$-$40_N$. The control circuitry 24 then writes the first and second patterns to the disk at whatever unknown radial position (track) of the write element 22B. The control circuitry then scan reads multiple adjacent tracks near the estimated target track to generate corresponding quality metrics which may be evaluated to determine the radial location of the target track. The radial offset may then be measured as the difference between the initial radial location of the read element when writing the patterns to the disk, and the detected radial location of the target track.

Figure 4B:
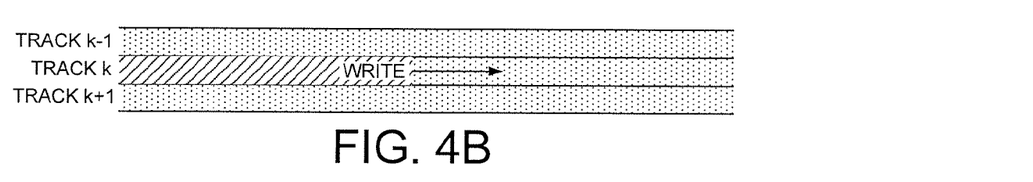
Figure 4C:
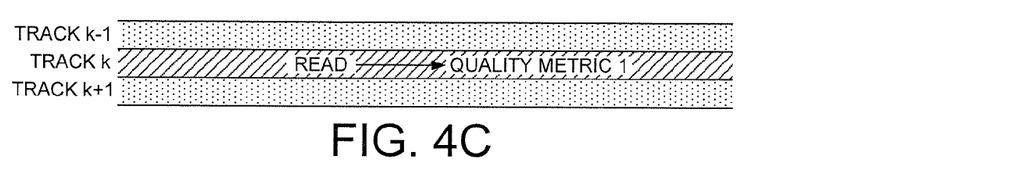
Figure 4D:
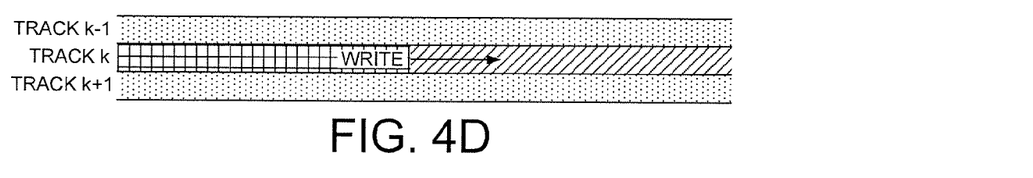
Figure 4E:
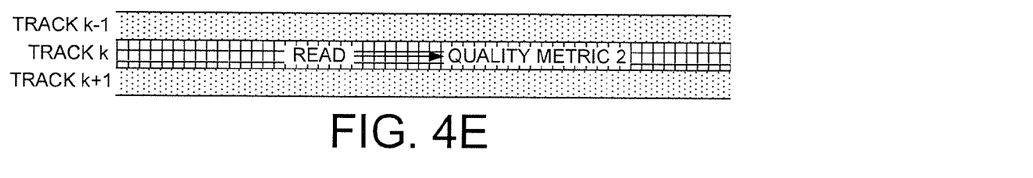

Referring again to FIG. 3, during a first revolution of the disk a first pattern is written to a target track (block 50) as illustrated in FIG. 4B. Although the pattern is shown in FIG. 4B as being written along a centerline of track k, the pattern may be written at any suitable radial offset from the centerline since the radial offset between the read element and write element may include a fraction of a track. Multiple adjacent tracks are then scan read over multiple disk revolutions to generate a read signal for each track (block 52), and the read signals are processed to generate a first quality metric for each track (block 54) such as the quality metric generated for the target track as shown in FIG. 4C. During a subsequent revolution of the disk, the second pattern is written to the target track (block 56) as illustrated in FIG. 4D, wherein the second pattern is different from the first pattern. Multiple adjacent tracks are then scan read over multiple revolutions of the disk to generate a read signal for each track (block 58), and the read signals are processed to generate a second quality metric for each track (block 60) such as the quality metric generated for the target track as shown in FIG. 4E. A third quality metric is generated based on the first quality metric and the second quality metric, such as by computing a difference between the first quality metric and the second quality metric (block 62). The radial offset between the read element and write element may then be measured based on the third quality metric (block 64). For example, in one embodiment the radial location of the written patterns may be detected at the radial location where the third quality metric reaches a maximum, and the radial offset between the read element and write element may be measured as the delta relative to the radial location of the read element when the patterns were written.

Figure 5:
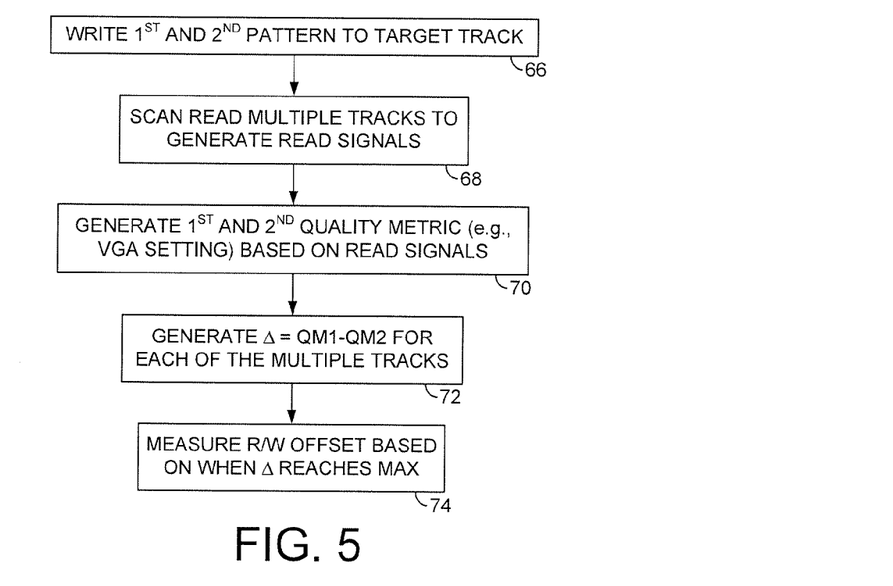
FIG. 5 is a flow diagram according to an embodiment wherein the first and second pattern are written during a first revolution of the disk and read during a second revolution of the disk.
Figure 6A:
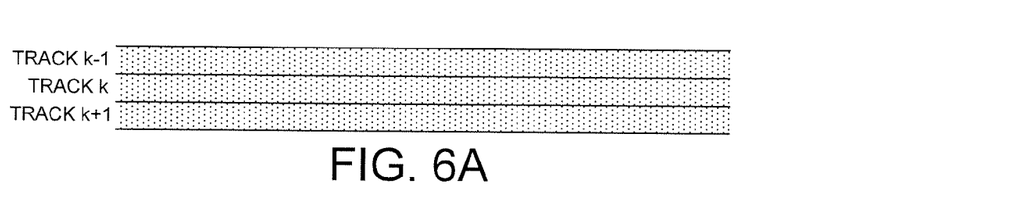
FIGS. 6A-6C illustrate an embodiment of the flow diagram of FIG. 5.
Figure 6B:
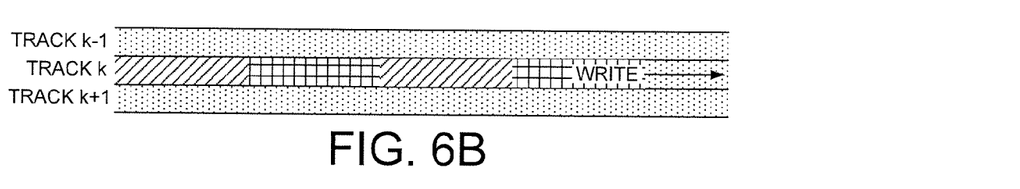
Figure 6C:
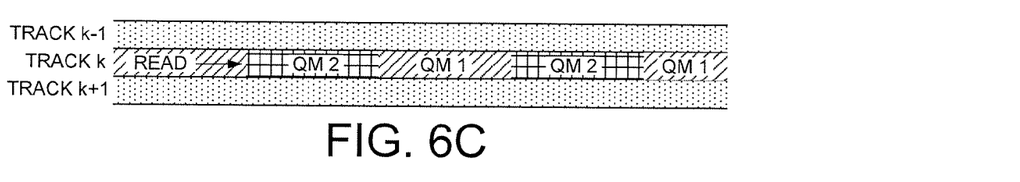

FIG. 5 is a flow diagram according to an alternative embodiment which may help expedite the process of measuring the radial offset between the read element and the write element as is understood with reference to the example shown in FIGS. 6A-6C. FIG. 6A shows a number of tracks, including a target track k and adjacent tracks k−1 and k+1. The tracks may be bulk erased as part of a manufacturing process for the disk, or the tracks may initially be in a random, unknown state. In one embodiment, the control circuitry 24 may write only to the target track k to measure the radial offset between the read element and write element, and in other embodiment, the control circuitry 24 may write to the target track k and adjacent tracks k−1 and k+1, such as to initially erase the tracks by writing an AC or DC erase signal.

Referring again to FIG. 5, during a first revolution of the disk the first pattern is written to a first segment of the target track, and the second pattern is written to a second segment of the target track (block 66) as illustrated in FIG. 6B. Multiple adjacent tracks are then scan read over multiple revolutions of the disk to generate a read signal for each track (block 68), and the read signals are processed to generate a first and second quality metric for the first and second segments for each track (block 70) such as the first and second quality metrics generated for the first and second segments of the target track as shown in FIG. 6C. A third quality metric is generated based on the first quality metric and the second quality metric, such as by computing a difference between the first quality metric and the second quality metric (block 72). The radial offset between the read element and write element may then be measured based on the third quality metric (block 74). The flow diagram of FIG. 5 requires less time than the embodiment of FIG. 3 since the first and second patterns are written to the target track during a single revolution of the disk, and the first and second quality metrics may be generated for each read during the radial scan over a single revolution of the disk. That is, instead of performing the two radial scans at block 52 and 58 in the flow diagram of FIG. 3, the control circuitry executes one radial scan at block 68 in the flow diagram of FIG. 5.

When scan reading the adjacent tracks (e.g., at blocks 52 and 58 of FIG. 3 or block 68 of FIG. 5), in one embodiment the control circuitry 24 may first perform a coarse scan read such as reading the centerline of the adjacent tracks in order to identify the target track where the first and second patterns were written. After locating the target track, in one embodiment the control circuitry 24 may perform a fine scan of the target track by reading the target track at different radial offsets from the track centerline and generating the first and second quality metrics as described above for each scan read. In this manner, the radial offset between the read element and write element may be measured accurately within a fraction of the target track. The flow diagram of FIG. 5 may expedite the embodiment employing a coarse scan followed by a fine scan since the adjacent tracks may be scan read (at block 68) without the intervening writing of the first and second patterns as in the flow diagram of FIG. 3.

Figure 2B:
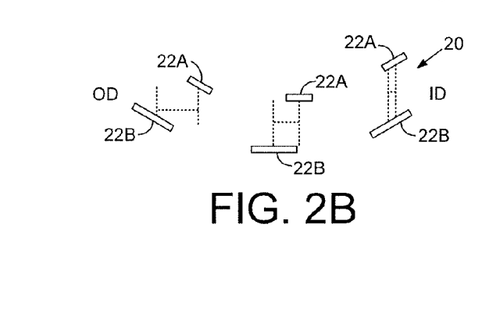
FIG. 2B shows a head according to an embodiment comprising a read element radially offset from a write element.
Figure 2C:
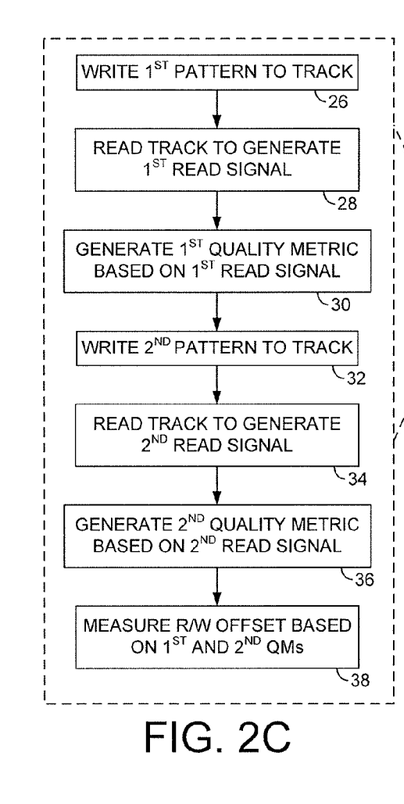
FIG. 2C is a flow diagram according to an embodiment wherein a first and second pattern are written to a single track in order to measure the radial offset of the read element and write element.

In one embodiment, the radial offset between the read element and write element may be measured at a number of different radial locations across the disk surface to account for the varying skew angle of the head 20 as shown in FIG. 2B. In one embodiment, the resulting radial offsets measured at the different radial locations may be curve fitted to a suitable polynomial which may then be used to generate the radial offset at any desired radial location (e.g., to perform a write and/or read operation at a target track).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

In various embodiments, a disk drive may include a magnetic disk drive, an optical disk drive, etc. In addition, while the above examples concern a disk drive, the various embodiments are not limited to a disk drive and can be applied to other data storage devices and systems, such as magnetic tape drives, solid state drives, hybrid drives, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
   a disk comprising a plurality of tracks;
   a head actuated over the disk, the head comprising a read element radially offset from a write element; and
   control circuitry configured to:
      write a first pattern to a single track;
      read the first pattern from the single track to generate a first read signal;
      generate a first quality metric based on the first read signal;
      write a second pattern to the single track, wherein the second pattern is different from the first pattern;
      read the second pattern from the single track to generate a second read signal;
      generate a second quality metric based on the second read signal; and
      measure the radial offset of the read element and write element based on the first and second quality metrics.

2. The data storage device as recited in claim 1, wherein the control circuitry is further configured to overwrite at least part of the first pattern with at least part of the second pattern.

3. The data storage device as recited in claim 2, wherein the control circuitry is further configured to:
   write the first pattern to the single track during a first revolution of the disk;
   read the first pattern from the single track during a second revolution of the disk;
   write the second pattern to the single track during a third revolution of the disk; and
   read the second pattern from the single track during a fourth revolution of the disk.

4. The data storage device as recited in claim 1, wherein the control circuitry is further configured to:
write the first pattern to a first part of the single track; and
write the second pattern to a second part of the single track.

5. The data storage device as recited in claim 4, wherein the control circuitry is further configured to write the first pattern and the second pattern to the single track during a first revolution of the disk.

6. The data storage device as recited in claim 5, wherein the control circuitry is further configured to read the first pattern and the second pattern from the single track during a second revolution of the disk.

7. The data storage device as recited in claim 1, wherein the first pattern comprises a DC pattern and the second pattern comprises a periodic pattern.

8. The data storage device as recited in claim 1, wherein the first pattern comprises a first periodic pattern having a first frequency and the second pattern comprises a second periodic pattern having a second frequency different from the first frequency.

9. The data storage device as recited in claim 1, wherein:
the first quality metric comprises a first setting for a variable gain amplifier; and
the second quality metric comprises a second setting for the variable gain amplifier.

10. The data storage device as recited in claim 1, wherein the control circuitry is further configured to measure the radial offset of the read element and write element based on a difference between the first quality metric and the second quality metric.

11. The data storage device as recited in claim 1, wherein the control circuitry is further configured to:
read at least one track adjacent the single track to generate a third read signal;
generate a third quality metric based on the third read signal; and
measure the radial offset of the read element and write element based on the first, second, and third quality metrics.

12. A data storage device comprising:
a disk comprising a plurality of tracks;
a head actuated over the disk, the head comprising a read element radially offset from a write element; and
control circuitry configured to:
write a first pattern to a target track;
read the first pattern from the target track to generate a first read signal;
generate a first quality metric based on the first read signal;
write a second pattern to the target track, wherein the second pattern is different from the first pattern;
read the second pattern from the target track to generate a second read signal;
generate a second quality metric based on the second read signal;
generate a third quality metric based on the first quality metric and the second quality metric; and
measure the radial offset of the read element and write element based on the third quality metric.

13. The data storage device as recited in claim 12, wherein the control circuitry is further configured to overwrite at least part of the first pattern with at least part of the second pattern.

14. The data storage device as recited in claim 13, wherein the control circuitry is further configured to:
write the first pattern to the target track during a first revolution of the disk;
read the first pattern from the target track during a second revolution of the disk;
write the second pattern to the target track during a third revolution of the disk; and
read the second pattern from the target track during a fourth revolution of the disk.

15. The data storage device as recited in claim 14, wherein the control circuitry is further configured to:
write the first pattern to a first part of the target track; and
write the second pattern to a second part of the target track.

16. The data storage device as recited in claim 15, wherein the control circuitry is further configured to write the first pattern and the second pattern to the target track during a first revolution of the disk.

17. The data storage device as recited in claim 16, wherein the control circuitry is further configured to read the first pattern and the second pattern from the target track during a second revolution of the disk.

18. The data storage device as recited in claim 12, wherein the first pattern comprises a DC pattern and the second pattern comprises a periodic pattern.

19. The data storage device as recited in claim 12, wherein the first pattern comprises a first periodic pattern having a first frequency and the second pattern comprises a second periodic pattern having a second frequency different from the first frequency.

20. The data storage device as recited in claim 12, wherein:
the first quality metric comprises a first setting for a variable gain amplifier; and
the second quality metric comprises a second setting for the variable gain amplifier.

21. The data storage device as recited in claim 20, wherein the control circuitry is further configured to generate the third quality metric based on a difference between the first quality metric and the second quality metric.

22. A method of operating a data storage device, the method comprising:
using a head to write a first pattern to a single track on a disk;
using the head to read the first pattern from the single track to generate a first read signal;
generating a first quality metric based on the first read signal;
using the head to write a second pattern to the single track, wherein the second pattern is different from the first pattern;
using the head to read the second pattern from the single track to generate a second read signal;
generating a second quality metric based on the second read signal; and
measuring a radial offset of a read element and a write element of the head based on the first and second quality metrics.

23. The method as recited in claim 22, further comprising:
writing the first pattern to a first part of the single track; and
writing the second pattern to a second part of the single track.

24. The method as recited in claim 23, further comprising writing the first pattern and the second pattern to the single track during a first revolution of the disk.

25. The method as recited in claim 24, further comprising reading the first pattern and the second pattern from the single track during a second revolution of the disk.

26. A method of operating a data storage device, the method comprising:
using a head to write a first pattern to a target track on a disk;
using the head to read the first pattern from the target track to generate a first read signal;

generating a first quality metric based on the first read signal;

using the head to write a second pattern to the target track, wherein the second pattern is different from the first pattern;

using the head to read the second pattern from the target track to generate a second read signal;

generating a second quality metric based on the second read signal;

generating a third quality metric based on the first quality metric and the second quality metric; and measuring the radial offset of a read element and a write element of the head based on the third quality metric.

27. The method as recited in claim 26, further comprising:
writing the first pattern to a first part of the target track; and
writing the second pattern to a second part of the target track.

28. The method as recited in claim 27, further comprising writing the first pattern and the second pattern to the target track during a first revolution of the disk.

29. The method as recited in claim 28, further comprising reading the first pattern and the second pattern from the target track during a second revolution of the disk.

* * * * *